June 29, 1971  J. LOJCZYC  3,589,006

TIN SNIPS

Filed July 29, 1968  2 Sheets-Sheet 1

INVENTOR
John Lojczyc
BY B.P. Fishburn, Jr.
ATTORNEY

June 29, 1971   J. LOJCZYC   3,589,006
TIN SNIPS

Filed July 29, 1968   2 Sheets-Sheet 2

INVENTOR
John Lojczyc
By B. P. Fishburn, Jr.
ATTORNEY

3,589,006
TIN SNIPS
John Lojczyc, 10620 106th St., Suite 1,
Edmonton, Alberta, Canada
Filed July 29, 1968, Ser. No. 748,417
Int. Cl. B26b 13/22
U.S. Cl. 30—144                    10 Claims

ABSTRACT OF THE DISCLOSURE

A shear is now provided comprising two cutter units: one unit has two spaced apart cutting blades; the other cutter unit has a single cutting blade positioned between the two cutting blades of the first unit, the units are pivotally connected in a manner similar to that of normal shears or tin snips. To assist in cutting sheet metal tubes having seams, the cutting edges have cutting portions longitudinally spaced therealong of different forms for cutting plain sheet material and for cutting the seams. The single cutting blade is provided with teeth on its back edge for cutting a starting slit in a tube.

---

This invention relates to hand shears for sheet material, in particular for sheet metal, of the type generally referred to as tin snips.

Normally such snips comprise two blades pivotally mounted side-by-side in overlapping relation, with cutting edges on the blades giving a shearing action, such as in scissors.

When used to cut sheet metal, normal snips produce distortion of the metal, causing it to twist, bend, or otherwise distort. Also normal snips are not easily used to cut sheet metal which has been formed into pipes.

The present invention provides a form of hand shear, or snips, which will substantially reduce, or completely avoid, distortion of the sheet material. A shear according to the present invention comprises two cutter units, one having two spaced apart cutting blades to the other having a single cutting blade positioned between the two cutting blades of the one unit. The units are pivotally connected, in a manner similar to normal shears or snips. To assist in cutting sheet metal tubes having seams, the cutting edges may have various portions, longitudinally spaced along the edges, of varying form, for cutting the plain sheet material and for cutting the seams. The single cutting blade may be provided with fine teeth on its back edge, that is the edge remote from the cutting edge, for cutting a starting slit in a tube.

The invenion will be readily understood by the following description of one particular embodiment, by way of example, in conjunction with the accompanying drawings, in which.

Figure 1:
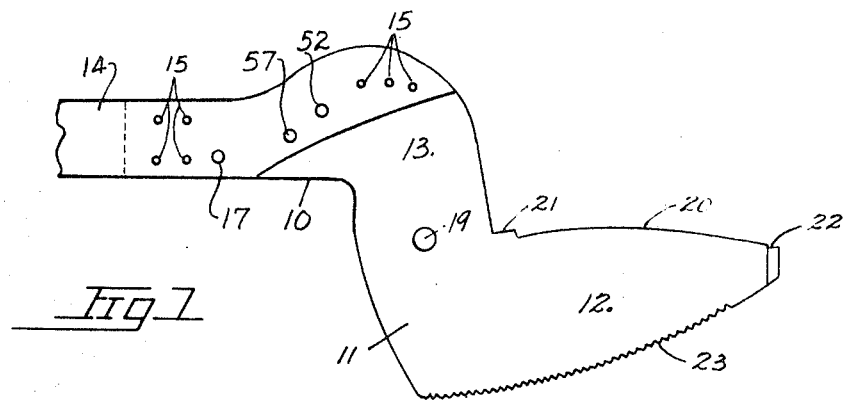
FIG. 1 is a side view of the cutting unit having a single blade.
Figure 2:
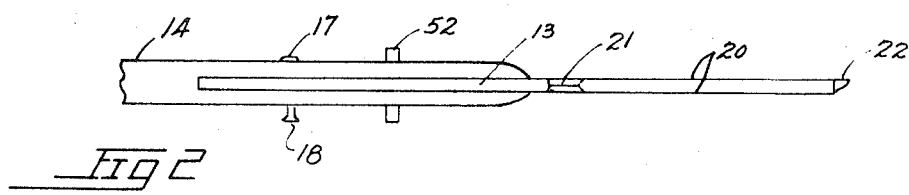
FIG. 2 is a top view of the unit of FIG. 1.

FIGS. 1 and 2 illustrate the cutting unit or member, indicated generally at 10, which has a single blade 11. Blade 11 is of a somewhat L shape, having a broad blade portion 12 and a shank 13 extending generally at right angles to the blade portion 12, at one end thereof. A handle 14 is attached to the shank 13, as by rivets 15, passing through the handle 14 to shank 13. The shank 13 is conveniently positioned in a slot 16 formed in one end of the handle 14.

Pin 17 also passes through the handle 14 and shank 13 and is a fixture therein, having a protruding end 18, for a purpose later described. A hole 19 is formed in the shank 13, adjacent its junction with blade portion 12, for a pivot pin, also later described.

The blade portion 12 is provided with hollow ground cutting edges 20, on its top or upper edge. The cutting edges 20 extend for the majority of the length of the top edge of the blade portion 12, but a short section 21 adjacent the junction of the blade portion 12 and shank 13 is slightly raised above the level of cutting edge 20, and is of a V configuration when viewed in cross-section. The cutting edge 20 is used for normal cutting and the section 21 is used to cut seams, as described later. The extreme end 22 of the top edge of the blade portion may be thinned to provide a thinner cutting section at that position.

To assist in starting cuts in tubes and similar closed sections, the bottom or lower edge of the blade portion 12 may be provided with cutting teeth, as indicated at 23. A slit can be cut in a tube by the teeth 23 and then the end of the blade portion 12 inserted in the slit to start cutting.

Figure 3:
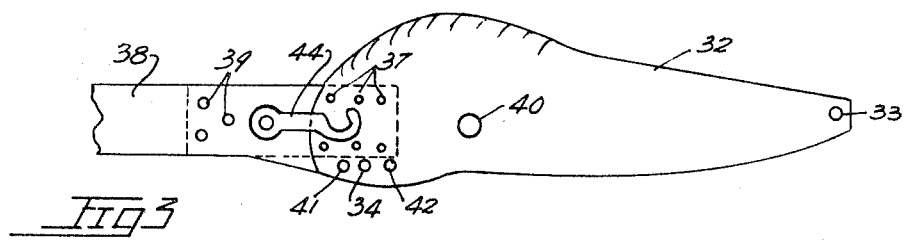
FIG. 3 is a side view of the cutting unit having two blades.
Figure 4:
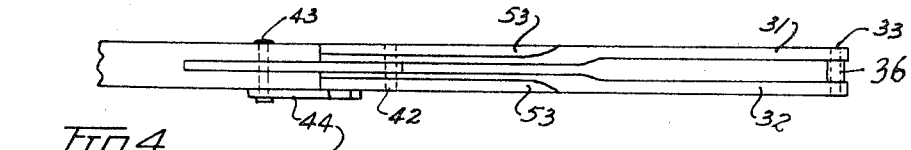
FIG. 4 is a top view of the unit of FIG. 3.
Figure 5:
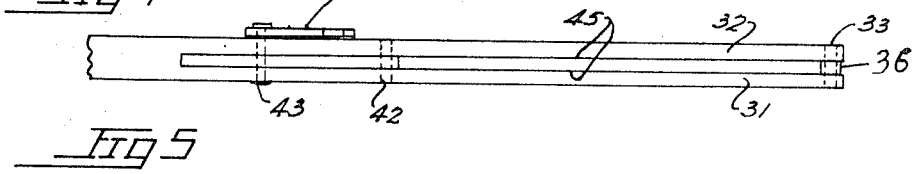
FIG. 5 is a bottom view of the unit of FIG. 3.

FIGS. 3, 4 and 5 illustrate the cutting unit or member, indicated generally at 30, having two blades 31 and 32. Blades 31 and 32 are elongated and attached fixedly together, with a small space between them, by bolts 33 and 34, a bolt at each end of the blades. Spacer washers 35 at the outer end of the blades provides the correct spacing at that end. A tang 36 is attached between the inner ends of the blades, by the bolt 34 and rivets 37. The tang 36 serves to maintain the correct spacing between the blades at the inner end, and a handle 38 is attached to the tang 36, by rivets 39.

A hole 40 is formed in both blades, in a position to cooperate with hole 19 in blade unit 10, for the insertion of a pivot pin, as later described. Two further holes 41 and 42 are formed through both blades, for reception of a stop pin, to be described later. A pin 43 passes through handle 38 and tang 36 and carries a pivotal hook 44. Hook 44 is intended to cooperate with the protruding end 18 of pin 17, in blade unit 10, as later described.

Each of the blades 31 and 32 are chamfered on their opposed sides, their bottom edges 45 being spaced apart the same distance as the thickness of the blade portion 12 of blade 11. The edges 45 form cutting edges which co-act with the cutting edges 20 of blade 11. The chamfering of the blades 31 and 32 is such as to increase the distance between the blades 31 and 32, towards their top edges 46. To reduce weight, and improve appearance, the blades 31 and 32 can be reduced in thickness at their top edges, particularly towards the handle 38.

Figure 6:
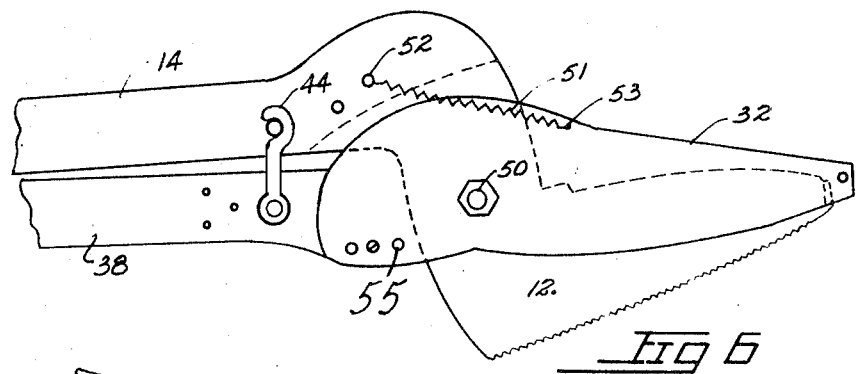
FIG. 6 is a side view of the complete shears in a closed position.

FIG. 6 illustrates an assembled shears, in the closed position. The blade units or members 10 and 30 are pivotally connected by a pin 50, positioned in the holes 19 and 40. The single blade 12 is positioned between the two spaced apart blades 31 and 32. To retain the shears in the closed position the hook 44 is pivoted on pin 43, to engage the protruding end 18 of pin 17 fixed in handle 14. To assist in moving the shears to an open position, with the hook 44 unhooked from pin 17, springs 51 may be provided. These springs are attached at one end to a pin 52 passing through handle 14 and protruding a short distance either side. At their other ends springs 51 are attached to the top edges of the blades 31 and 32, as by being hooked through holes 53 therein.

Figure 7:
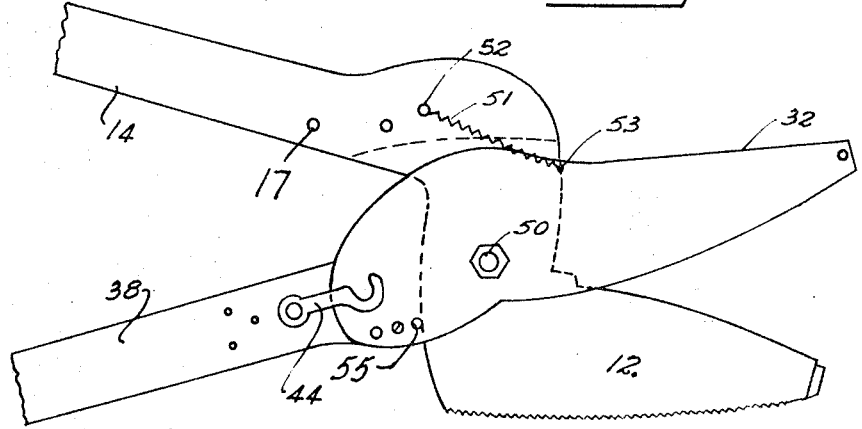
FIG. 7 is a side view of the shears of FIG. 6 in a normal cutting position.

FIG. 7 illustrates the shears in a normal maximum open position. This is the position to which the shears will open fully for normal cutting. With hook 44 unhooked from pin 17, springs 51 cause the shears to open until the inner end of the blade portion 12 contacts a pin 55. Pin 55 is removable and is inserted through holes 42 in blades 31 and 32. It will be seen that the shears open sufficiently for the cutting edge 20 of blade 12 to cooperate with edges 45 of blades 31 and 32, over the major part of their length, but the seam cutting section 21 remains covered at all times.

Figure 8:
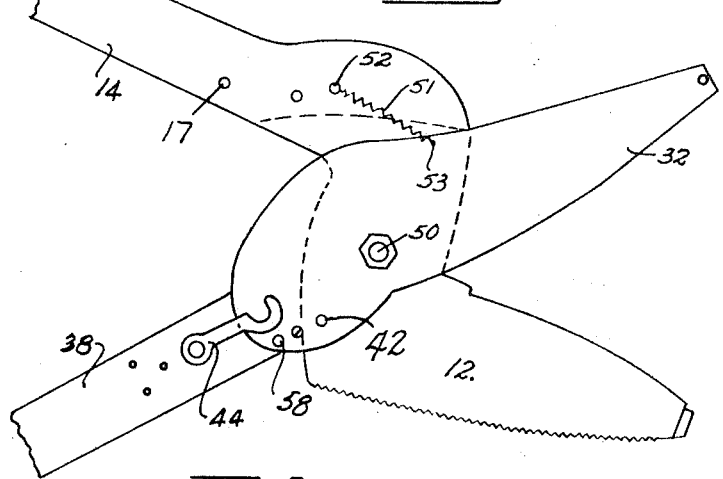
FIG. 8 is a side view of the shears of FIG. 6 in a maximum open position for seam cutting.

To cut seams, the shears are opened to an abnormal position, as illustrated in FIG. 8. To obtain this abnormal position, pin 55 is removed. To prevent loss, pin 55 may be attached to some convenient part of the shears by some form of flexible cord, or plastic or other flexible correction. Also, while not in use it can be inserted into a hole 57 in the handle of blade unit 10 (in FIG. 1). Removal of the pin 55 enables the shears to open wider and uncovers the seam cutting section 21.

A further pin 58 may be fixed in the blade unit 30 for the hook 44 to rest on when in the unhooked condition.

Various other means for limiting and condtrolling the opening of the blades can be used, instead of removable pin 55.

In use, if a tube, or some other closed shape is to be cut, a short slit is cut by using the teeth 23, which form a saw. Once a slit is cut, the thin end 22 of blade 12 is inserted into the slit and a cut started. Gradually the blade 12 can be pushed right through the slit and normal cutting ensues. When a seam is met, pin 55 is removed and the shears opened wider. Section 21 is used to cut the seam, after which the shears are closed slightly and the pin 55 reinserted in holes 56.

The materials used for the shears can be those normally used for such instruments. However, with the blades separate from the handles, materials can be selected which are particularly suited for the particular purpose. Thus an alloy steel particular suitable for providing sharp, long lasting cutting edges can be used for the blades, while some other, more ductile material, can be used for the handles. The handles can be straight, or slightly curved, particularly at their ends remote from the blades. Another form of handle is one in which closed loops are formed at the end, such as in scissors.

The embodiments of the invention in which an exclusive property or privilege is claimed are defined as follows:

1. Hand shears comprising a first elongated blade unit and a second elongated blade unit pivotally connected intermediate their ends in overlapping relationship; the first blade unit comprising a single blade portion and a handle poriton; the second blade unit comprising two spaced apart blade portions in side-by-side relationship and a handle portion, the two spaced apart blade portions defining a gap within which said single blade portion can move from an open position to a closed position; said single blade portion having one edge formed to provide two parallel cutting edges extending a major part of the length of said edge from an end remote from the pivotal connection, and having said edge formed to provide a short single cutting edge for a minor part of said edge at a position adjacent said pivotal connection; each of said two spaced apart blade portions formed with a cutting edge to engage with the parallel cutting edges on said single blade portion, one of said spaced apart blade portions also formed with a cutting edge to cooperate with said short single cutting edge on said single blade portion; the arrangement such that normal opening of the shears provides for cutting by the parallel cutting edges on the single blade portion and the cutting edges on the spaced apart blade portions, and wider opening provides for cutting by the short single cutting edge on the single blade portion.

2. Hand shears as claimed in claim 1, wherein the end of the single blade portion, remote from the pivotal connection, is tapered in the direction of the length of the blade portion, the taper on one side of the blade portion thereby leaving a single cuting edge at said end.

3. Hand shears as claimed in claim 1, wherein in the closed position the single blade portion of said first blade unit protrudes from between the two spaced apart blade portions of said second blade unit, thereby form an exposed edge, said exposed edge being formed with a series of teeth to provide a serrated cutting ege.

4. Hand shears as claimed in claim 1 wherein said blade units are formed from separate blade portions and handle portions rigidly interconnected to form said blade units.

5. Hand shears as claimed in claim 1 wherein said second blade units is formed from two separate spaced apart blade portions rigidly attached to a handle portion, and including spacer means extending between the blade portions at their ends remote from said handle portion.

6. Hand shears as claimed in claim 1 including a hook member pivotally attached to one blade unit, and a pin extending laterally from the other blade unit, said hook to said pin positioned so that said hook member engages with said pin to retain the shears in a closed position.

7. Hand shears as claimed in claim 1 including at least one spring extending between said blade units, said spring acting to bias said blade units to an open position.

8. Hand shears as claimed in claim 1 including a removable stop pin in said first blade unit, said stop pin adapted to limit the opening of said blade portions whereby said short single cutting edge on said single blade portion is not exposed for cutting, removal of said stop pin permitting further opening of said blade portion to expose said short single cutting edge.

9. Hand shears as claimed in claim 1 wherein said two spaced apart blade portions and said handle portion of said second blade unit are in substantial alignment, and said first blade unit is of generally Z-shaped configuration, the blade portion being offset from said handle portion on the other side of said pivotal connection to said hand portion.

10. Hand shears as claimed in claim 1 wherein the handle portions are substantially straight and extend substantially parallel to each other in closely spaced relationship, in the closed position.

References Cited

UNITED STATES PATENTS

| | | | |
|---|---|---|---|
| 1,201,106 | 10/1916 | Shuter | 30—258 |
| 2,163,088 | 6/1939 | Grant | 30—258 |
| 2,980,995 | 4/1961 | Booth | 30—144 |
| 3,039,191 | 6/1962 | Saxton | 30—258 |

ROBERT C. RIORDON, Primary Examiner

J. C. PETERS, Assistant Examiner

U.S. Cl. X.R.

30—258